(12) United States Patent
Johnson et al.

(10) Patent No.: US 6,452,747 B1
(45) Date of Patent: Sep. 17, 2002

(54) DATA STORAGE TAPE CARTRIDGE WITH WEAR-RESISTANT BRAKE ASSEMBLY

(75) Inventors: Michael W. Johnson, Cottage Grove, MN (US); Wayne Hemzacek, Westminster, CO (US)

(73) Assignees: Imation Corp., Oakdale, MN (US); Storage Technology Corp., Louisville, CO (US)

( * ) Notice: Subject to any disclaimer, the term of this patent is extended or adjusted under 35 U.S.C. 154(b) by 0 days.

(21) Appl. No.: 09/558,964

(22) Filed: Apr. 25, 2000

(51) Int. Cl.[7] .............................................. G11B 23/107
(52) U.S. Cl. ..................... 360/132; 242/338.1; 242/348
(58) Field of Search ........................ 360/132; 242/338.1, 242/348, 343, 343.1, 343.2

(56) References Cited

U.S. PATENT DOCUMENTS

| | | | |
|---|---|---|---|
| 5,027,249 A | 6/1991 | Johnson et al. ............. 360/132 |
| 5,316,235 A | 5/1994 | East et al. .................. 242/199 |
| 5,328,117 A | 7/1994 | Teuber et al. ............. 242/578.3 |
| 5,366,173 A | * 11/1994 | Lammers et al. ......... 242/338.1 |
| 5,513,815 A | 5/1996 | Erickson et al. ............ 242/346 |
| 5,564,647 A | 10/1996 | Bay et al. ................ 242/608.8 |
| 5,826,811 A | * 10/1998 | Melbye et al. ........... 242/345.2 |
| 5,893,527 A | * 4/1999 | Mizutani et al. ............ 242/348 |
| 6,034,850 A | * 3/2000 | Del Genio et al. ......... 360/132 |
| 6,040,966 A | 3/2000 | Erickson .................... 360/132 |
| 6,113,020 A | * 9/2000 | Nayak ........................ 242/348 |
| 6,154,342 A | * 11/2000 | Vanderheyden et al. .... 360/132 |
| 6,264,126 B1 | * 7/2001 | Shima et al. ............... 242/343 |
| 6,273,352 B1 | * 8/2001 | Johnson et al. ............. 242/340 |

FOREIGN PATENT DOCUMENTS

| | | |
|---|---|---|
| EP | 366368 A2 | 5/1990 |
| GB | 2236092 | 3/1991 |
| JP | 11-238352 | * 8/1999 |
| JP | 11-273307 | * 10/1999 |

\* cited by examiner

*Primary Examiner*—Jefferson Evans
(74) *Attorney, Agent, or Firm*—Dicke, Billig & Czaja, P.A.

(57) ABSTRACT

A data storage tape cartridge for use with a high speed tape drive as part of a tape drive system. The data storage tape cartridge includes a housing, at least one tape reel, a storage tape, a brake body, and a spring. The housing defines an enclosure and forms an opening for accessing the enclosure. The tape reel is rotatably disposed within the enclosure, and defines a central bore. The tape reel maintains the storage tape. The brake body is disposed within the central bore of the tape reel and includes a stem, a reel engagement section, and a button. The stem is slidably connected to the housing. The reel engagement section is configured to selectively engage a portion of the tape reel in a locked position. The button is positioned opposite the stem and terminates in a leading end. In a preferred embodiment, the leading end forms a concave surface configured to selectively receive a rounded surface associated with a tape drive. Finally, the spring biases the brake body to the locked position. During use, the concave surface of the brake button is selectively engaged by a rounded surface, such as a bearing ball, associated with a drive spindle portion of a tape drive. Upon rotation of the spindle, frictional and thermal forces are minimized, thereby preventing brake body deterioration at high rotational speeds.

28 Claims, 5 Drawing Sheets

DATA STORAGE TAPE CARTRIDGE WITH WEAR-RESISTANT BRAKE ASSEMBLY

BACKGROUND OF THE INVENTION

The present invention relates to a data storage tape cartridge for use with a tape drive as part of a tape drive system. More particularly, it relates to a data storage tape cartridge incorporating a brake body exhibiting high-wear resistant characteristics when engaged by a correspondingly configured tape drive spindle.

Data storage tape cartridges have been used for decades in the computer, audio, and video fields. The data storage tape cartridge continues to be an extremely popular form of recording large volumes of information for subsequent retrieval and use.

A data storage tape cartridge generally consists of an outer shell or housing maintaining at least one tape reel and a length of magnetic storage tape. The storage tape is wrapped about a hub portion of the tape reel and is driven through a defined tape path by a driving system. The tape reel is normally axially aligned with an opening in the housing through which the tape reel can be accessed and engaged by a tape drive chuck. Further, the housing forms a window at a forward portion thereof for allowing access to the storage tape by a read/write head. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, a single tape reel is normally provided. Conversely, where the tape cartridge/drive system is designed to provide head/storage tape interaction within or very near the housing, a two- or dual-tape reel configuration is typically utilized.

Regardless of the number of tape reels associated with a particular data storage tape cartridge, each tape reel is preferably "locked" to the housing when not otherwise engaged by a tape drive. To this end, a brake assembly is provided for each tape reel. The brake assembly can assume a wide variety of forms, such as multiple brake bodies biased to selectively engage an outer circumference of the tape reel. A more common, less expensive approach includes a single brake body and a spring disposed within a central bore of the tape reel. The brake body is normally an integrally formed component, configured to rigidly connect the tape reel to the housing in a locked position. In this regard, the brake body generally defines a housing engagement portion and a tape reel engagement portion. The housing engagement portion is normally slidably connectable to the housing. For example, the housing will include an inwardly extending tab, whereas the housing engagement portion is a stem forming a slot sized to slidably receive the tab. Conversely, the tape reel engagement portion is selectively connectable to the tape reel. Typically, the tape reel engagement portion is a series of teeth sized to engage or mesh with a corresponding toothed portion of the tape reel in the locked position. Finally, the spring is provided to bias the brake body to the locked position.

During use, the brake body must be moved out of the locked position to allow tape reel rotation as a rotatable tape drive chuck engages the tape reel. This is normally accomplished by providing the tape drive chuck with a spindle that contacts and guides the brake body, via a central bore in a tape reel, from the locked position. This area of contact is established between a leading surface (or "button") formed by the brake body and a tip of the spindle. The leading surface of the button is normally generally convex, whereas the spindle tip is flat. Importantly, upon rotation of the drive chuck, and thus the spindle, the brake body remains stationary, with the spindle tip spinning against the brake button. Due to the flat spindle tip and the convex button, the spindle tip/button interface may move from a desired location along the axis of rotation of the spindle.

The above-described two-piece brake assembly design is widely employed. However, certain issues have been identified in conjunction with tape drive system advancements. For example, advancements in tape media, read/write head technology, driving systems, etc., have resulted in tape drive systems able to desirably operate at greatly increased tape speeds. As a point of reference, tape drive system improvements have increased the maximum operational tape speed from about 1 meter per second to speeds in the range of 48 meters per second. This increased tape speed translates to drive chuck rotational rates on the order of 2000 RPM. While the current brake assembly design is highly satisfactory at relatively low tape speeds, potential problems may arise with elevated tape speeds. In particular, the increased rotational rate of the drive spindle against the brake button will rapidly generate a large amount of friction. The friction not only causes brake button deteriorate, but also generates heat that may promote further brake body deterioration, even melting. This highly undesirable result is due not only to brake body material, but also to movement of the brake button/spindle interface from along the axis of rotation of the spindle.

Data storage tape cartridges are important tools used to maintain vast amounts of information. To remain competitive, data storage tape cartridge manufacturers must continually improve cartridge performance while reducing or maintaining overall costs. To this end, currently employed tape reel braking assemblies, and in particular the brake body, will likely fail at higher tape speeds associated with advanced tape drives. Therefore, a need exists for a data storage tape cartridge utilizing a brake body configured to maintain structural integrity at elevated tape drive speeds.

SUMMARY OF THE INVENTION

One aspect of the present invention relates to a data storage tape cartridge. The data storage tape cartridge includes a housing, at least one tape reel, a storage tape, a brake body, and a spring. The housing includes first and second housing sections combining to define an enclosure. In this regard, the second housing section forms an opening, whereas the first housing section includes a connector, preferably an inwardly extending tab, opposite the opening. The tape reel defines a central bore and is rotatably disposed within the enclosure such that the bore is axially aligned with the housing opening. The tape reel maintains the storage tape. The brake body is disposed within the central bore of the tape reel and includes a stem, a reel engagement section and a button. The stem is configured to be slidably attached to the connector associated with the first housing section. In one preferred embodiment, where the connector is a tab, the stem forms a slot sized to receive the tab. The reel engagement section is configured to selectively engage a portion of the tape reel in a locked position, preferably in the form of radial teeth. The button is positioned opposite the stem and terminates in a leading end forming a concave surface configured to selectively receive a portion of a rounded surface associated with a tape drive. Finally, the spring is positioned to bias the brake body to the locked position. With the above configuration, the concave surface of the brake body is accessible by a tape drive through the opening in the second housing section and the central bore in the tape reel. Prior to use, the spring biases the brake body to the locked position, whereby the brake body rigidly connects the tape reel to the housing. Upon insertion into a tape drive, a portion of the tape drive, such as a drive spindle, forces the brake body out of the locked position. A rounded surface of the drive spindle, for example a bearing ball, contacts and rotates within the concave surface of the brake body. Due to the unique interface between the drive spindle and brake body, frictional and thermal forces are minimized, even at high tape speeds. In one preferred embodiment, the brake body is integrally formed from a high-heat resistant material.

Another aspect of the present invention relates to a tape drive system comprising a tape drive, a data storage tape cartridge and an engagement assembly. The tape drive includes a motor and a drive chuck. The drive chuck is rotatably driven by the motor and includes an engagement hub and a spindle. The spindle extends axially from the engagement hub and terminates in a tip. The data storage tape cartridge includes a housing, at least one tape reel, a storage tape, a brake body, and a spring. The housing defines an enclosure. The enclosure is accessible through an opening formed in the housing. The tape reel is rotatably disposed within the enclosure and defines a central bore that is axially aligned with the opening. The tape reel maintains the storage tape. The brake body is slidably disposed within the central bore and is configured to rigidly connect the tape reel to the housing in a locked position. Further, the brake body includes a button terminating in leading end forming a concave surface. The brake body is positioned such that the concave surface is accessible via the central bore. The spring is positioned to bias the brake body to the locked position. Finally, the engagement assembly is established between the tip of the spindle and the leading end of the brake body. The engagement assembly includes a rounded surface and a concave surface configured to selectively receive the rounded surface. In one preferred embodiment, the rounded surface is provided by a bearing ball secured to the spindle. In another preferred embodiment, the rounded surface is provided by a bearing ball secured to the brake body. Regardless, during use, the engagement hub engages the tape reel and the rounded surface is received by the concave surface such that the spindle directs the brake body out of the locked position. Upon activation of the motor, the drive chuck rotates the tape reel. In one preferred embodiment, the rounded surface associated with the spindle rotates within the concave surface of the brake button. In another preferred embodiment, the concave surface associated with the spindle rotates about the rounded surface of the brake button. In either case, due to the unique interface between the spindle and the brake body, frictional and thermal forces are minimized, thereby allowing operation of the tape drive at elevated tape speeds without brake body failure.

Yet another aspect of the present invention relates to a method of operating a tape drive system. The method includes providing a tape drive, a data storage tape cartridge and an engagement assembly. The tape drive includes a frame and a drive chuck including an engagement hub and a spindle terminating in a tip. The data storage tape cartridge includes a housing, at least one tape reel, a storage tape and a brake body. The tape reel is rotatably disposed within the housing, and maintains the storage tape. The brake body is configured to selectively connect the tape reel to the housing in a locked position and includes a button terminating in a leading end. The engagement assembly is established between the tip of the spindle and the leading end of the brake body, and includes a rounded surface and a concave surface. The concave surface is configured to selectively receive the rounded surface. The data storage tape cartridge is inserted into the frame. The spindle is directed toward the brake body such that the rounded surface contacts the concave surface. The brake body is then guided from the locked position with further movement of the spindle. The engagement hub then engages the tape reel. The drive chuck is rotated, in turn rotating the tape reel. The brake body remains stationary during tape drive chuck/tape reel rotation. Rotation of the drive spindle is subsequently stopped. Finally, the drive arm is retracted such that the rounded surface disengages the concave surface.

Yet another aspect of present invention relates to a brake body for use with a data storage tape cartridge for selectively rigidly connecting a tape reel to a cartridge housing in a locked position. The brake body includes a stem, a reel engagement section and a button. The stem is configured to slidably engage a portion of the cartridge housing. The reel engagement section is configured to selectively engage a portion of the tape reel in a locked position. Finally, the button is formed opposite the stem and terminates in a leading end forming a concave surface. The concave surface is configured to selectively receive a rounded surface associated with a tape drive, such as a bearing ball captured by a drive spindle.

Yet another aspect of the present invention relates to a data storage tape cartridge. The data storage tape cartridge includes a housing, at least one tape reel, a storage tape, a brake body, and a spring. The housing includes first and second housing sections combining to define an enclosure. In this regard, the second housing section forms an opening, whereas the first section includes a connector, preferably an inwardly extending tab, opposite the opening. The tape reel defines a central bore and is rotatably disposed: within the enclosure such that the bore is axially aligned with the housing opening. The tape reel maintains the storage tape. The brake body is disposed within the central bore of the tape reel and includes a stem, a reel engagement section and a button. The stem is configured to be slidably attached to the connector associated with the first housing section. The reel engagement section is configured to selectively engage a portion of the tape reel in a locked position. The button is positioned opposite the stem and terminates in a leading end. The leading end forms a rounded surface configured to be selectively received by a concave surface associated with the tape drive. Finally, the spring is positioned to bias the brake body to the locked position. With the above configuration, the rounded surface of the brake body is accessible through the opening in the second housing section and the central bore in the tape reel. Upon insertion into a tape drive, a portion of the tape drive, such as a drive spindle, forces the brake body out of the locked position. A concave surface of the drive spindle contacts and rotates about the rounded surface of the brake body. Due to the unique interface between the drive spindle and the brake body, frictional and thermal forces are minimized, even at high tape speeds.

DESCRIPTION OF THE EMBODIMENTS

Figure 1:
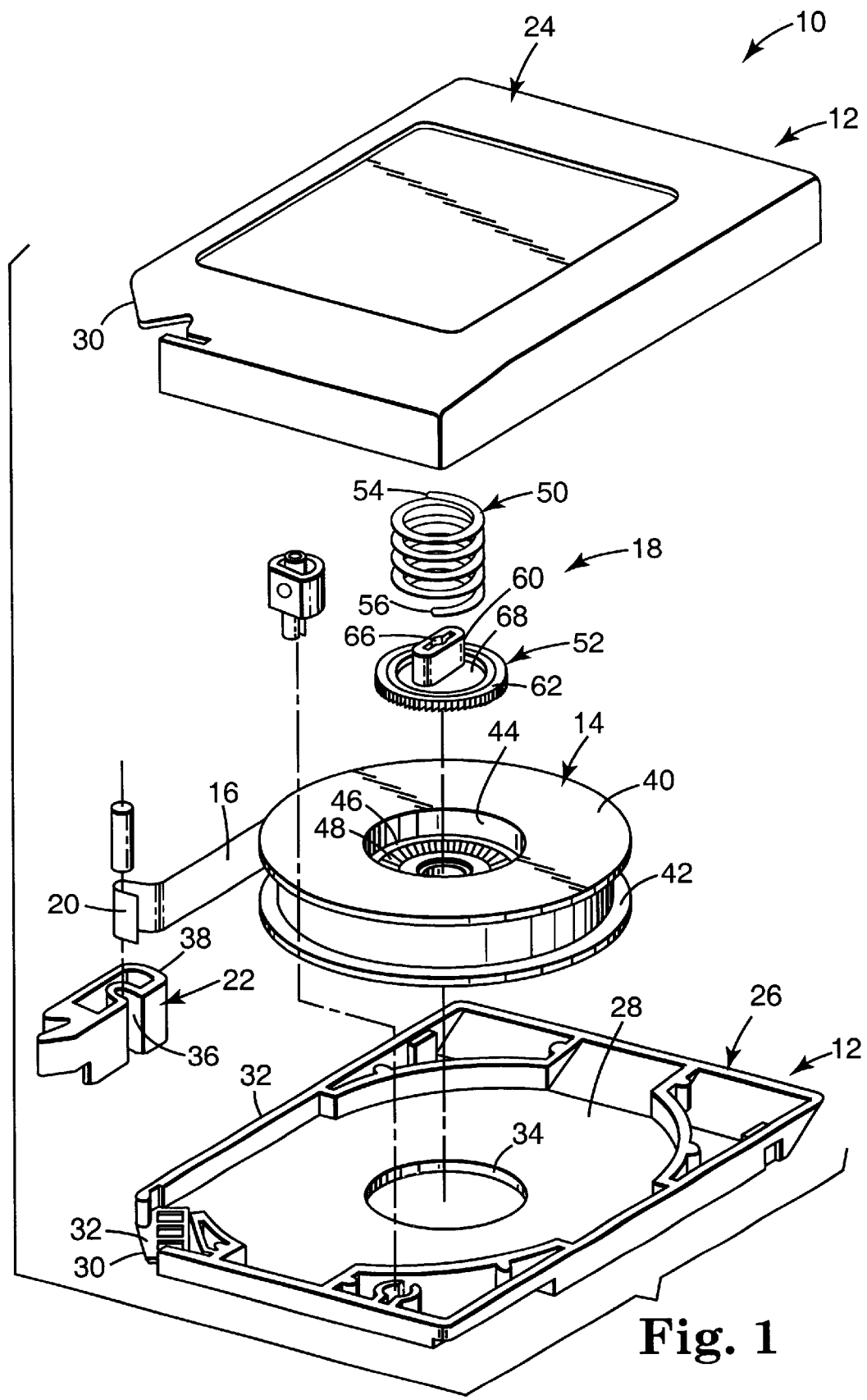
FIG. 1 is an exploded, perspective view of a data storage tape cartridge in accordance with the present invention.

One preferred embodiment of a data storage tape cartridge 10 is shown in FIG. 1. Generally speaking, the data storage tape cartridge 10 includes a housing 12, at least one tape reel 14, a storage tape 16, and a brake assembly 18. The tape reel 14 is disposed within the housing 12. The storage tape 16, in turn, is wound about a portion of the tape reel 14 and includes a free-end 20 attached to a leader block 22. Finally, the brake assembly 18 is centrally positioned within a portion of the tape reel 14 and is connected to a portion (not shown) of the housing 12.

The housing 12 is sized in accordance with industry-accepted tape drive form factors. Thus, the housing 12 can assume a form factor size of approximately 125 mm×110 mm×21 mm, although other form factors or dimensions are equally acceptable. With this in mind, the housing 12 is defined by a first housing section 24 and a second housing section 26. In one preferred embodiment, the first housing section 24 provides a cover, whereas the second housing section 26 serves as a base. It should be understood that as used through this specification, directional terminology, such as "cover," "base," "upper," "lower," "top," "bottom," etc., are used for purposes of illustration only, and are in no way limiting.

The first and second housing sections 24, 26 are configured to be reciprocally mated to one another to define an enclosure 28 for maintaining various other components of the data storage tape cartridge 10. The housing 12 is preferably generally rectangular, except for one corner 30, which is angled and forms a leader block window 32. The leader block window 32 is configured to hold the leader block 22 and serves as an opening for the storage tape 16 to exit from the enclosure 28 such that the storage tape 16 can be threaded to a tape drive (not shown) when the leader block 22 is removed from the leader block window 32. Conversely, when the leader block 22 is snapped into the leader block window 32, the leader block window 32 is covered.

In addition to the leader block window 32, the second housing section 26 further forms an opening 34. The opening 34 facilitates access to the tape reel 14 by a drive chuck portion of a tape drive (not shown). Conversely, the first housing section 24 includes a connector (not shown) formed on an inner face thereof. As described in greater detail below, the connector is positioned opposite the central opening 34 and is configured to retain a portion of the brake assembly 18. As is known to those of ordinary skill, in one preferred embodiment, the connector is a tab sized to slidably receive a portion of the brake assembly 18. Alternatively, the connector may assume other forms known in the art, such as a series of teeth.

Leader blocks are also well known in the art. In one embodiment, a front surface of the leader block 22 includes a slot 36 for engaging an automatic threading apparatus of a reel-to-reel magnetic tape drive apparatus (not shown) and engages an inclined surface of the corner 30 of the housing 12. A rear surface 38 is rounded to form a portion of an arc of a radius to match the periphery of the take-up hub (not shown) in the tape drive apparatus as the leader block 22 fits into a slot in the take-up hub. Alternatively, other configurations known in the art for the leader block 22 are equally acceptable. Even further, depending upon a desired configuration of the data storage tape cartridge 10, the leader block 22 may be eliminated, such as with a dual tape reel design.

The tape reel 14 is generally comprised of an upper flange 40, a lower flange 42, and a hub ring 44. The storage tape 16 is wound about the hub 44, constrained laterally by the flanges 40, 42. Further, the tape reel 14 defines a central bore 46 and interior toothed surface 48. As described in greater detail below, the central bore 46 is sized to receive the brake assembly 18, and the interior toothed surface 48 is configured to selectively engage a corresponding surface of the brake assembly 18. Upon final assembly, the central bore 46 is axially aligned with the central opening 34 provided in the housing 12. Alternatively, the tape reel 14 may assume other forms known in the art. Further, more than one of the tape reel 14 can be provided. Regardless, the tape reel 14 is rotatably disposed within the enclosure 28 formed by the housing 12.

The storage tape 16 is preferably a magnetic tape of a type commonly known in the art. For example, the storage tape 16 can consist of a balanced polyethylene naphthalate-(PEN) based material coated on one side with a layer of magnetic material dispersed within suitable binder system, and on the other side with a conductive material dispersed within a suitable binder system. Acceptable magnetic tape is available, for example, from Imation Corp., of Oakdale, Minn.

The brake assembly 18 preferably consists of a spring 50 and a brake body 52. The spring 50 is preferably a coil spring having a first end 54 and a second end 56. The first end 54 is configured to abut an inner face (not shown) of the first housing section 24, whereas the second end 56 is configured to abut a portion of the brake body 52.

Figure 2:
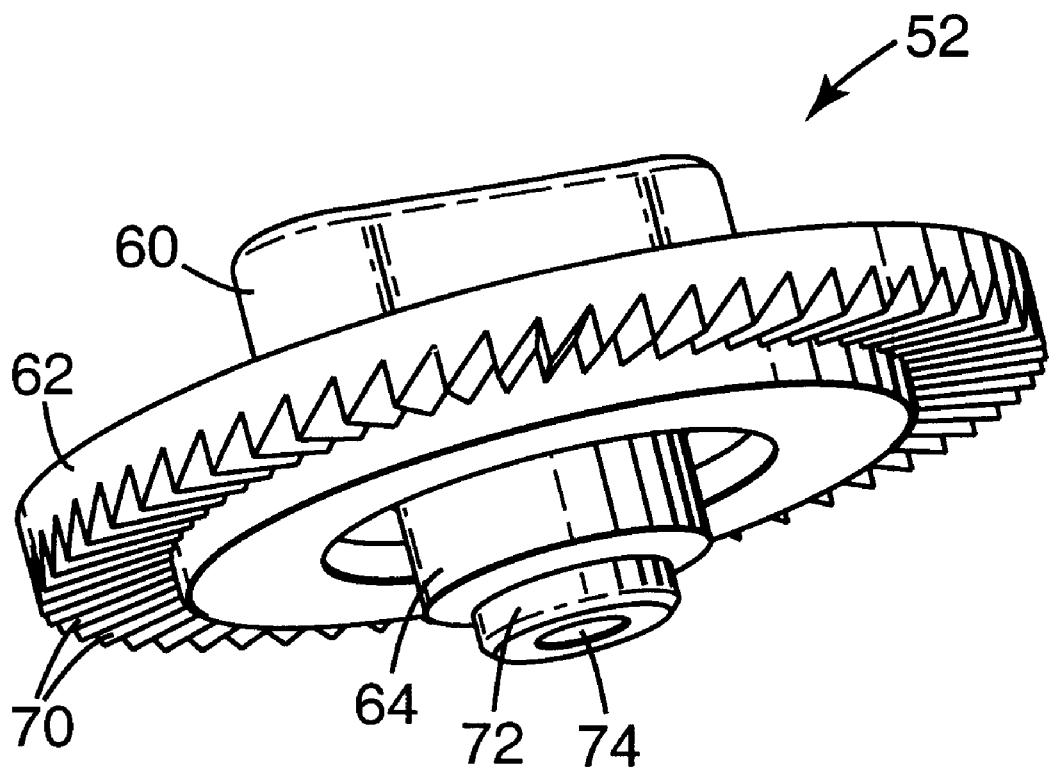
FIG. 2 is a perspective view of a brake body associated with the data storage tape cartridge of FIG. 1.

With reference to FIGS. 1 and 2, the brake body 52 includes a stem 60, an annular flange 62, and a button 64. The stem 60 and the button 64 extend axially from the annular flange 62 in opposing directions.

The stem 60 is formed to engage a connector (not shown) portion of the first housing section 24, as previously described. In a preferred embodiment, the connector is an inwardly extending tab, such that the stem 60 forms a slot 66 (shown best in FIG. 1) sized to receive the tab. With this configuration, the stem 60 can be slidably coupled to the housing 12 via the slot 66. Alternatively, the stem 60 can assume other housing engagement configurations known in the art, such as a toothed surface.

The annular flange 62 defines a central aperture 68 (shown best in FIG. 1) and forms radial teeth 70. The central aperture 68 is configured to maintain the second end 56 of the spring 50. Conversely, the radial teeth 70 are configured to selectively engage the interior toothed surface 48 of the tape reel 14. Thus, the radial teeth 70 provide a reel engagement section for the brake body 52. Alternatively, the brake body 52 can be formed to include other reel engagement configurations, such as a series of spaced tabs.

The button 64 extends downwardly from the annular flange 62 (relative to the orientation of FIG. 2) and terminates in a leading end 72. The leading end 72, in turn, forms a concave surface 74. The concave surface 74 is configured to selectively receive a rounded surface (not shown) associated with a tape drive (not shown), such as a bearing ball, and therefore defines a spherical radius corresponding with, and preferably slightly larger than, the spherical radius of the tape drive rounded surface. In this regard, the concave surface 74 is preferably less than hemispherical such that the concave surface 74 will not permanently retain the rounded surface. In one preferred embodiment, the concave surface 74 has a spherical radius of approximately 0.115 inch (2.92 mm) corresponding with a tape drive rounded surface having a spherical radius of 0.109 inch (2.77 mm), although other dimensions are equally acceptable.

The brake body 52 including the stem 60, the annular flange 62, and the button 64, is preferably integrally formed from a high heat resistant material. For example, the brake body 52 is an acetal material impregnated with approximately 20% polytetrafluorothylene powder, such as Teflon® powder. Alternatively, other heat resistant materials such as Ultem® impregnated with an appropriate resin, such as Teflon®, are also acceptable. Even further, the leading end 72 can be formed separate from remaining portions of the brake body 52, and subsequently assembled to the button 64. With this embodiment, the leading end 72 effectively serves as a wear pad and is formed from the high-heat resistant materials previously described, whereas a remainder of the brake body 52 can be formed from other, less expensive materials.

Figure 3:
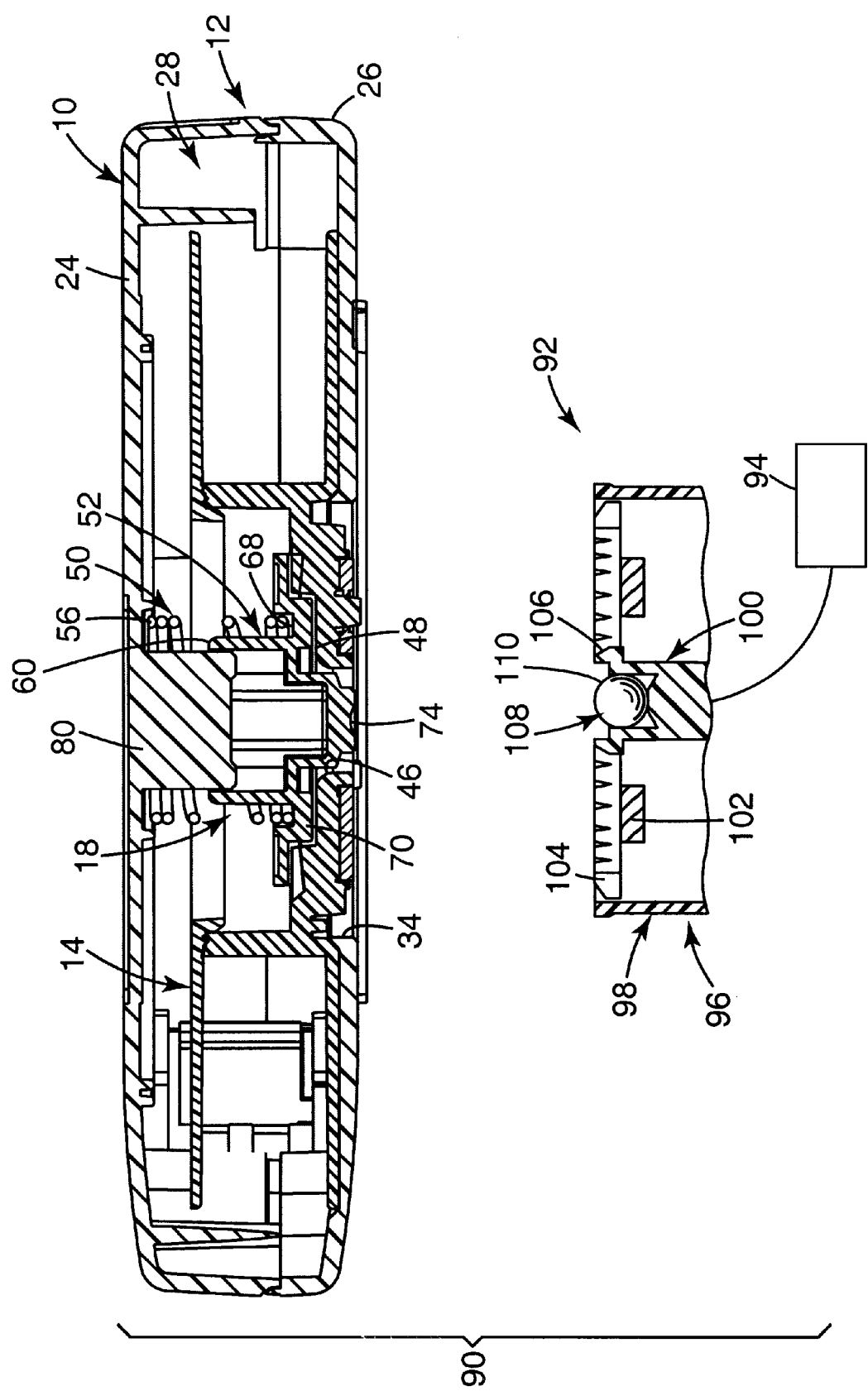
FIG. 3 is a central, transverse cross-sectional view of a tape drive system in accordance with the present invention, including the data storage tape cartridge of FIG. 1 and a tape drive prior to engagement.

The data storage tape cartridge 10 is shown in a final, assembled form in FIG. 3. For ease of illustration, the storage tape 16 (FIG. 1) and the leader block 22 (FIG. 1) have been omitted from the view of FIG. 3. As previously described, the tape reel 14 and the brake assembly 18 are disposed within the enclosure 28 defined by the housing 12. In this regard, the central bore 46 defined by the tape reel 14 is generally axially aligned with the opening 34 in the second housing section 26. Further, the brake body 52 is disposed within the bore 46 of the tape reel 14. In this regard, the first housing section 24 is shown as including an inwardly extending tab 80. The tab 80 is slidably received within the slot 68 formed by the stem 60 of the brake body 52. With this configuration, the tab 80 serves as a guide for consistently aligning the brake body 52 relative to the tape reel 14. The spring 50 is similarly disposed within the bore 46 of the tape reel 14, with the first end 54 abutting the first housing section 24, and the second end 56 abutting the brake body 52 within the aperture 68. With this configuration, the spring 50 urges the brake body into a locked position relative to the tape reel 14 as shown in FIG. 3. In this locked position, the radial teeth 70 of the brake body 52 engage the interior toothed surface 48 of the tape reel 14. Because the brake body 52 remains engaged to the housing 12 via interaction of the stem 60 with the tab 80, the brake body 52 effectively rigidly connects the tape reel 14 to the housing 12, thereby preventing unexpected rotation of the tape reel 14 relative to the housing 12 in the locked position.

As a point of reference, the data storage tape cartridge 10 is shown in FIG. 3 as part of a tape drive system 90 that further includes a tape drive 92, a portion of which is shown in FIG. 3. The tape drive 92 includes a motor 94 (shown schematically) and a drive chuck 96. The drive chuck 96 is rotatably driven by the motor 94 and includes an engagement hub 98 and a spindle 100. In one preferred embodiment, the engagement hub 98 includes a magnet 102 and teeth 104 for engaging the tape reel 14, as is known in the art. Regardless, the engagement hub 98 is connected to the spindle 100, with the spindle 100 terminating at a tip 106. In a preferred embodiment, a bearing ball 108 is captured within the tip 106. The bearing ball is preferably a hardened, highly smooth material, such as a stainless steel bearing ball, and provides a rounded surface 110. As shown in FIG. 3, a relationship of the bearing ball 108 and the spindle 100 is such that a portion of the rounded surface 110 is exposed at the tip 106. For example, the tip 106 can be open ended, and the bearing ball 108 frictionally-retained within the spindle 100. Alternatively, the spindle 100 can be configured such that the tip 106 forms the rounded surface 110, thereby eliminating the bearing ball 108.

Figure 4:
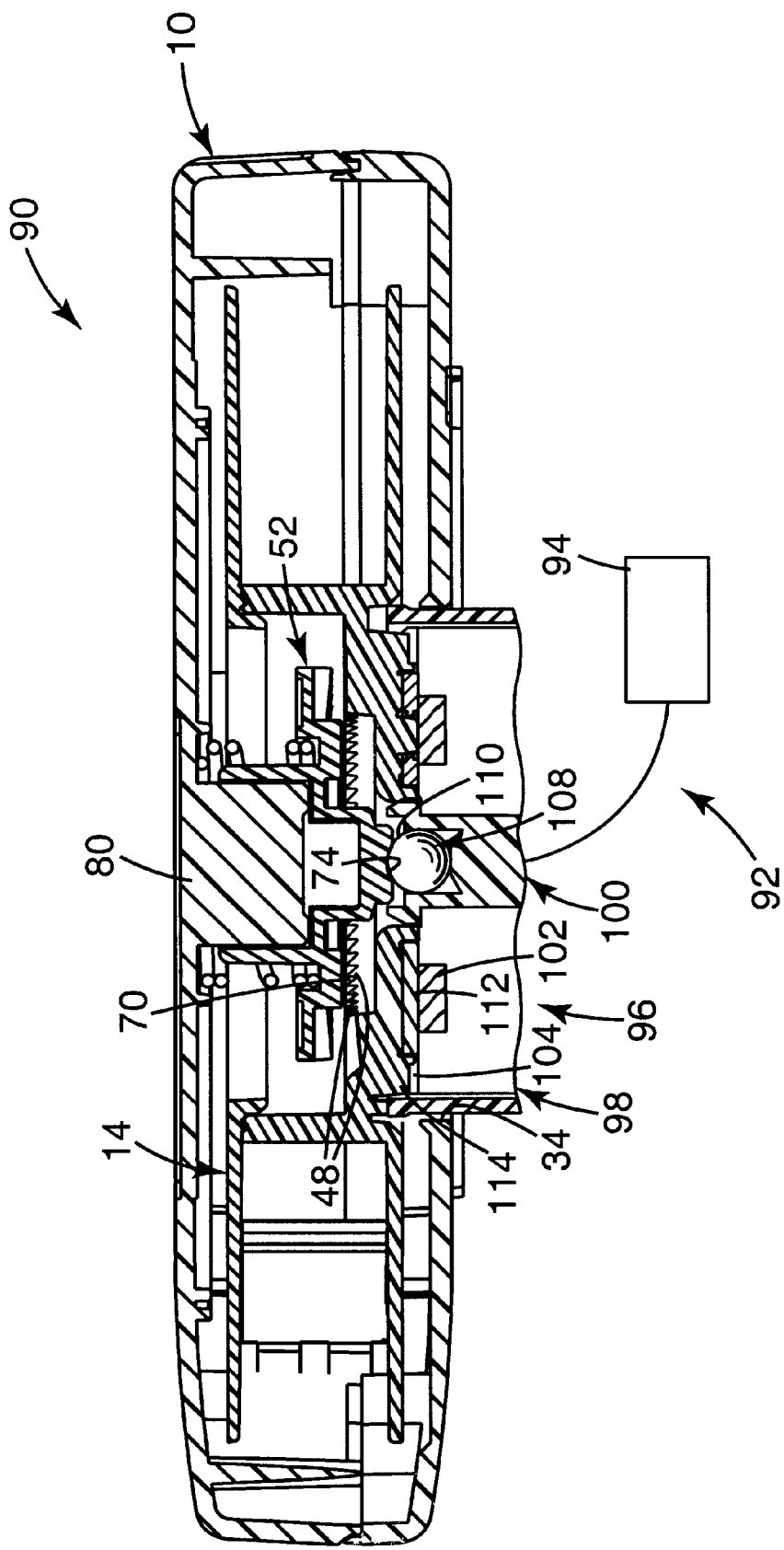
FIG. 4 is the cross-sectional view of the tape drive system of FIG. 3, depicting the data storage tape cartridge engaged by the tape drive.

During use, the brake body 52 must be guided from the locked position to allow rotation of the tape reel 14 by the tape drive 92. Thus, after insertion of the data storage tape cartridge 10 into a frame (not shown) associated with the tape drive 92, the tape drive system 90 is operated such that the drive chuck 96 engages the tape reel 14 and the brake body 52. More particularly, as shown in FIG. 4, the drive chuck 96 is directed upwardly (relatively to the orientation of FIGS. 3 and 4) such that the engagement hub 98 engages the tape reel 14 at the opening 34. For example, the magnet 102 attracts a flat metallic washer 112 associated with the tape reel 14. Further, the tape reel 14, and in particular the lower flange 42, preferably includes teeth 114 that mesh with the teeth 104 formed on the engagement hub 98.

In addition to interaction between the engagement hub 98 and the tape reel 14, the spindle 100 guides the brake body 52 out of the locked position. In particular, the spindle 100 is directed such that the rounded surface 110 of the bearing ball 108 is received within the concave surface 74 of the brake body 52. Further movement of the spindle 100 (upward relative to the orientation of FIG. 4) overcomes the bias of the spring 50, causing the brake body 52 to slide along the tab 80 to a point whereby the radial teeth 70 of the brake body 52 disengage the interior toothed surface 48 of the tape reel 14. Preferably, the concave surface 74 is configured to have a spherical radius slightly larger than that of the rounded surface 110 provided by the bearing ball 108, so that the two components centrally interface. The interface or contact area/point between the concave surface 74 and the rounded surface 110 is self-centering, located along an axis of rotation of the spindle 100. Alternatively, a substantially uniform interface may be established.

Once engaged, the drive chuck 96 is rotated, via the motor 94, in turn rotating the tape reel 14. In accordance with recent technological advancements, the tape reel 14 can be rotated at speeds on the order of 2000 RPM or more to achieve tape speeds on the order of 10 meters per second. The brake body 52 remains stationary with rotation of the drive chuck 96. To this end, the bearing ball 108, and in particular the rounded surface 110, rotates within the concave surface 74 provided by the brake body 52. An interface between the rounded surface 110 and the concave surface 74 is preferably a point contact. By centering the interface along the axis of rotation of the spindle 100, the rotational surface speed of the rounded surface 110 at the concave surface 74/rounded surface 110 interface is effectively negligible, so that thermal and frictional forces on the brake body 52 are minimized. Further, because the spherical radius of the concave surface 74 is preferably greater than that of the rounded surface 110, the rounded surface 110 will remain engaged Within the concave surface 74 in the event the spindle 100 (and thus the rounded surface 110) is misaligned and/or the bearing ball 108 (and thus the rounded surface 110) unexpectedly moves laterally. As a result, the concave surface 74 is effectively self-centering relative to the rounded surface 110. Additionally, the concave surface 74 is preferably made of a high heat resistant material, further minimizing frictionally-induced heat.

Following use, the drive chuck 96 is retracted to from the data storage tape cartridge 10. To this end, the bearing ball 108 (or other component providing the rounded surface 110 in alternative embodiments) disengages the brake body 52. In other words, in one embodiment, the bearing ball 108 is not part of the data storage tape cartridge 10, but instead is available for use with other, similarly configured cartridges.

In the preferred embodiment, the concave surface 74 is provided as part of the brake body 52, and thus of the data storage tape cartridge 10; whereas the rounded surface 110 (e.g., the bearing ball 108) is included as part of the tape drive 92. Alternatively, however, the tape drive system 90 can be configured such that these two components are reversed. That is to say, the tip 106 of the spindle 100 can be formed to provide a concave surface, and the brake body 52 configured to form a corresponding, rounded surface at the leading end 72, such as by a bearing ball. With this configuration of the tape drive system, engagement of the data storage tape cartridge 10 within the tape drive 92 causes the spindle 100 to contact the brake body 52. More particularly, the concave surface formed at the tip 106 of the spindle 100 engages the rounded surface (e.g., bearing ball) at the leading end 72 of the brake body 52. Once again, a unique interface is established. Upon rotation of the spindle 100, the concave surface of the spindle 100 rotates centrally about the rounded surface of the brake body 52 with minimal, if any, wear of the two components.

With either embodiment, an engagement assembly is effectively established between the brake body 52 and the spindle 100. The engagement assembly includes a rounded surface (such as the rounded surface 110 provided by the bearing ball 108) and a concave surface (such as the concave surface 74 of the brake body 52). The concave surface is configured to selectively receive the rounded surface, and is preferably formed from a high heat resistant material. During use, the rounded surface is received by concave surface as the spindle 100 directs the brake body 52 out of the locked position. Due to the unique interface provided by the corresponding concave/rounded surfaces, and the preferred high heat resistant nature of the concave surface, rotation of the spindle 100 relative to the brake body 52 at high speeds does not result in failure of the brake body 52 or the spindle 100.

Figure 5:
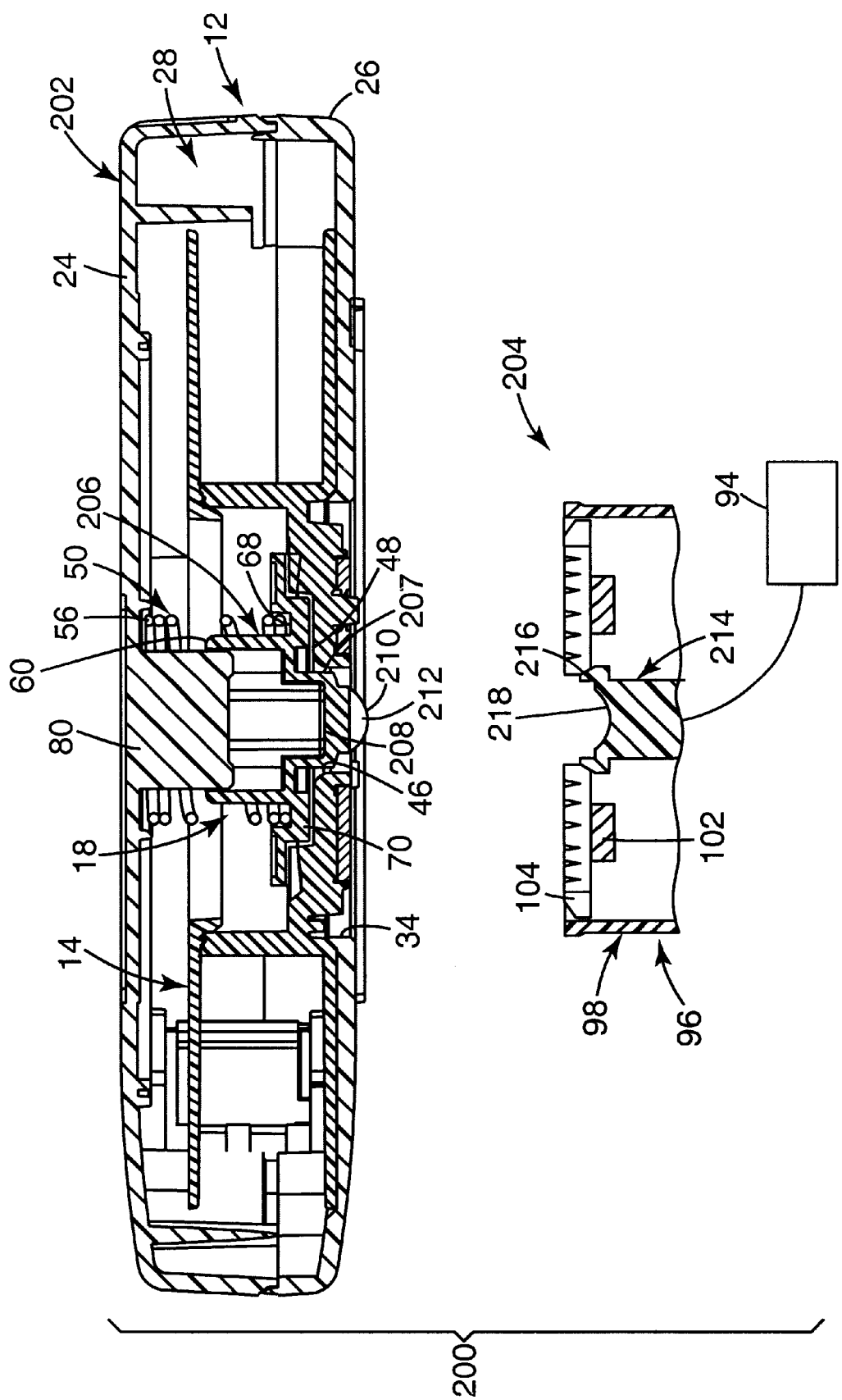
FIG. 5 is a central, transverse cross-sectional view of an alternative embodiment tape drive system in accordance with the present invention, including a data storage tape cartridge and a tape drive prior to engagement.

FIG. 5 shows an alternative embodiment tape drive system 200 in accordance with the present invention, including a data storage tape cartridge 202 and a tape drive 204 prior to engagement. The tape drive system 200 is highly similar to the tape drive system 90 illustrated in FIG. 3. The tape drive system 200 includes a data storage tape cartridge 202 (highly similar to the data storage tape cartridge 10 of FIG. 3 with like elements being similarly numbered) and a tape drive 204 (highly similar to the tape drive 92 of FIG. 3 with like elements being similarly numbered). The data storage tape cartridge 202 includes a break body 206 with a button 207 terminating in a leading end 208. Unlike previous embodiments, the leading end 208 forms a rounded surface 210. In one embodiment, the rounded surface 210 is provided by a bearing ball 212 permanently retained by the break body 206. Further, the tape drive 204 includes a spindle 214 with a tip 216. In contrast to previous embodiments, the tip 216 of the spindle 214 forms a concave surface 218. The rounded surface 210 of the break body 206 is configured to be selectively received by the concave surface 218 of the tip 216.

The drive system, including the data storage tape cartridge, of the present invention provides a marked improvement over previous designs. Unlike prior art brake body/drive spindle configurations, the tape drive system of the present invention virtually eliminates brake body deterioration at extremely high tape speeds. In this regard, the essentially central interface between drive spindle and brake body results in minimal friction and heat. Further, by employing a high heat resistant material for the brake body, the effects of frictionally-caused heat are minimized. Finally, the brake assembly remains highly simplistic, incorporating only two parts, such that an overall cost increase for a data storage tape cartridge manufactured in accordance with the present invention is negligible.

Although the present invention has been described with reference to preferred embodiments, workers skilled in the art will recognize that changes can be made in form and detail without departing from the spirit and scope of the present invention. For example, the data storage tape cartridge has been described with reference to a single-reel design. Alternatively, the disclosed embodiments can be incorporated into a dual-reel data storage tape cartridge.

What is claimed is:

1. A data storage tape cartridge comprising:
    a housing including:
        a first housing section including a connector,
        a second housing section forming an opening opposite the connector, the housing sections combining to define an enclosure;
    at least one tape reel rotatably disposed within the enclosure, the tape reel defining a central bore;
    a storage tape maintained by the tape reel;
    a brake body disposed within the central bore of the tape reel, the brake body including:
        a stem configured to slidably receive the connector,
        a reel engagement section configured to selectively engage a portion of the tape reel in a locked position,
        a button positioned opposite the stem and terminating in a leading end, the leading end forming a concave surface configured to selectively receive a rounded surface associated with a tape drive; and
    a spring biasing the brake body to the locked position;
    wherein the concave surface of the brake body is accessible through the opening in the second housing section and the central bore in the tape reel.

2. The data storage tape cartridge of claim 1, wherein the stem, the reel engagement section and the button are integrally formed.

3. The data storage tape cartridge of claim 1, wherein the leading end includes a wear pad forming the concave surface.

4. The data storage tape cartridge of claim 1, wherein at least the leading end is formed from a plastic material impregnated with a heat resistant resin.

5. The data storage tape cartridge of claim 4, wherein at least the leading end is formed from acetal impregnated with 20% polytetrafluoroethylene.

6. The data storage tape cartridge of claim 1, wherein the concave surface is less than hemispherical.

7. The data storage tape cartridge of claim 1, wherein the connector is an inwardly extending tab, and further wherein the stem forms a slot sized to slidably receive the tab.

8. A tape drive system comprising:
    a tape drive including:
        a motor,
        a drive chuck rotatably driven by the motor, the drive chuck including:
            an engagement hub,
            a spindle extending axially from the engagement hub, the spindle terminating in a tip;
    a data storage tape cartridge comprising:

a housing defining an enclosure, the enclosure being accessible through an opening in the housing, at least one tape reel rotatably disposed within the enclosure, the tape reel defining a central bore axially aligned with the opening, a storage tape maintained by the tape reel, a brake body slidably disposed within the central bore, the brake body configured to selectively rigidly connect the tape reel to the housing in a locked position and including a button terminating in a leading end, the brake body being positioned such that the leading end is accessible via the central bore, a spring biasing the brake body to the locked position; and an engagement assembly established between the tip and the leading end, the engagement assembly comprising:
a rounded surface,
a concave surface configured to selectively receive the rounded surface;

wherein during use, the tape drive system is configured such that the engagement hub engages the tape reel and the rounded surface is received by the concave surface to direct the brake body out of the locked position.

9. The tape drive system of claim 8, wherein the concave surface is less than hemispherical.

10. The tape drive system of claim 8, wherein the tape drive system includes a bearing ball providing the rounded surface.

11. The tape drive system of claim 8, wherein the concave surface is formed at the leading end of the brake body and the rounded surface is formed at the tip of the spindle.

12. The tape drive system of claim 11, wherein the brake body is integrally formed.

13. The tape drive system of claim 11, wherein the leading end of the brake body includes a wear pad forming the concave surface.

14. The tape drive system of claim 11, wherein the rounded surface is a bearing ball permanently retained by the spindle.

15. The tape drive system of claim 8, wherein the concave surface is formed at the tip of the spindle and the rounded surface is formed at the leading end of the brake body.

16. The tape drive system of claim 15, wherein the rounded surface is a bearing ball permanently retained by the brake body.

17. The tape drive system of claim 8, wherein the concave surface is formed from a plastic material impregnated with a heat resistant resin.

18. A method of operating a tape drive system, the method comprising:

providing a tape drive system including a tape drive, a data storage tape cartridge and an engagement assembly, wherein the tape drive includes a frame and a drive chuck having an engagement hub and a spindle terminating in a tip, and further wherein the data storage tape cartridge includes a housing, at least one tape reel rotatably disposed within the housing, a storage tape maintained by the tape reel and a brake body configured to selectively connect the tape reel to the housing in a locked position, the brake body including a button terminating in a leading end, and further wherein the engagement assembly is established between the tip of the spindle and the leading end of the brake body and includes a rounded surface and a concave surface configured to selectively receive the rounded surface;

inserting the data storage tape cartridge into the frame;

directing the spindle toward the brake body such that the rounded surface contacts the concave surface;

guiding the brake body from the locked position with further movement of the spindle;

engaging the tape reel with the engagement hub;

rotating the drive chuck to rotate the tape reel, wherein the spindle rotates with rotation of the drive chuck, whereas the brake body remains stationary;

ceasing rotation of the drive chuck; and retracting the drive chuck such that the rounded surface disengages the concave surface.

19. The method of claim 18, wherein rotating the drive chuck to rotate the tape reel includes limiting contact between the drive chuck and the brake body to an interface of the rounded surface and the concave surface.

20. The method of claim 18, wherein providing a tape drive system includes securing a bearing ball to the tip of the spindle to provide the rounded surface.

21. The method of claim 18, wherein providing a tape drive system includes securing a bearing ball to the leading end of the brake body to provide the rounded surface.

22. A brake body for use with a data storage tape cartridge for selectively rigidly connecting a tape reel to a cartridge housing in a locked position, the brake body comprising:

a stem forming a slot sized to slidably receive a portion of housing;

a reel engagement section configured to selectively engage a portion of a tape reel in a locked position; and a button positioned opposite the stem, the button terminating in a leading end forming a concave surface configured to selectively receive a rounded surface associated with a tape drive.

23. The brake body of claim 22, wherein the stem, the reel engagement section, and the button are integrally formed.

24. The brake body of claim 22, wherein the leading end includes a wear pad forming the concave surface.

25. The brake body of claim 22, wherein the concave surface is less than hemispherical.

26. A data storage tape cartridge comprising:

a housing including:
a first housing section including a connector,
a second housing section forming an opening opposite the connector, the housing sections combining to define an enclosure;

at least one tape reel rotatably disposed within the enclosure, the tape reel defining a central bore;

a storage tape maintained by the tape reel;

a brake body disposed within the central bore of the tape reel, the brake body including:
a stem configured to slidably receive the connector,
a reel engagement section configured to selectively engage a portion of the tape reel in a locked position,
a button positioned opposite the stem and terminating in a leading end, the leading end forming a rounded surface configured to be selectively received by a concave surface associated with a tape drive; and a spring biasing the brake body to the locked position;

wherein the rounded surface is accessible through the opening in the second housing section and the central bore in the tape reel.

27. The data storage tape cartridge of claim 26, further including a bearing ball associated with the leading end of the brake body, the bearing ball providing the rounded surface.

28. The data storage tape cartridge of claim 27, wherein the bearing ball is permanently secured to the brake body.

* * * * *

UNITED STATES PATENT AND TRADEMARK OFFICE
CERTIFICATE OF CORRECTION

PATENT NO.     : 6,452,747 B1
DATED          : September 17, 2002
INVENTOR(S)    : Michael W. Johnson et al.

It is certified that error appears in the above-identified patent and that said Letters Patent is hereby corrected as shown below:

<u>Column 4,</u>
Line 37, after "disposed" please delete ":".

<u>Column 7,</u>
Line 37, after "received" please delete "15".

<u>Column 8,</u>
Line 58, please delete "Within" and insert -- within --.

Signed and Sealed this

Eighth Day of July, 2003

JAMES E. ROGAN
*Director of the United States Patent and Trademark Office*